(12) United States Patent
Lacroix-Desmazes et al.

(10) Patent No.: US 7,078,473 B2
(45) Date of Patent: Jul. 18, 2006

(54) RADICAL POLYMERIZATION METHODS AND HALOGENATED POLYMERS

(75) Inventors: Patrick Lacroix-Desmazes, Montpellier (FR); Romain Severac, Grabels (FR); Bernard Boutevin, Montpellier (FR); Vincent Bodart, Tavaux (BE); Vincent Kurowski, Estaimbourg (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 10/512,870

(22) PCT Filed: May 16, 2003

(86) PCT No.: PCT/EP03/05314

§ 371 (c)(1),
(2), (4) Date: Nov. 16, 2004

(87) PCT Pub. No.: WO03/097704

PCT Pub. Date: Nov. 27, 2003

(65) Prior Publication Data

US 2005/0171312 A1     Aug. 4, 2005

(30) Foreign Application Priority Data

May 17, 2002   (FR)  .................... 02 06246

(51) Int. Cl.
*C08F 14/02* (2006.01)
*C08F 293/00* (2006.01)

(52) U.S. Cl. ............... 526/343; 526/86; 526/87; 526/135; 526/219.3; 526/227; 526/238; 526/255; 526/296; 526/344; 526/345; 525/267; 525/273; 525/276; 525/292; 525/318

(58) Field of Classification Search .......... 526/86, 526/87, 135, 219.3, 255, 344, 227, 238, 296, 526/345, 343; 525/199, 267, 239, 273, 318, 525/276, 292

See application file for complete search history.

(56) References Cited

U.S. PATENT DOCUMENTS

| | | | |
|---|---|---|---|
| 3,467,636 A * | 9/1969 | Nersasian | 526/229.5 |
| 4,180,634 A * | 12/1979 | Koyanagi et al. | 526/62 |
| 5,312,871 A * | 5/1994 | Mardare et al. | 525/272 |
| 6,838,535 B1 * | 1/2005 | Percec et al. | 526/161 |
| 2004/0071973 A1 | 4/2004 | Bodart et al. | |
| 2004/0198702 A1 | 10/2004 | Petrova et al. | |
| 2005/0171312 A1 | 8/2005 | Lacroix-Desmazes et al. | |

FOREIGN PATENT DOCUMENTS

| | | |
|---|---|---|
| EP | 0 617 057 | 9/1994 |
| FR | 2 318 177 | 2/1977 |

OTHER PUBLICATIONS

U.S. Appl. No. 10/553,993, filed Oct. 20, 2005, Lacroix-Desmazes et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

Radical polymerization process for the preparation of halogenated polymers and block copolymers. Halogenated polymers and block copolymers.

21 Claims, No Drawings

RADICAL POLYMERIZATION METHODS AND HALOGENATED POLYMERS

CROSS REFERENCES TO RELATED APPLICATIONS

This application is a national stage application of International Patent Application No. PCT/EP03/05314, filed on May 16, 2003, and claims priority to French Patent Application No. 0206246, filed on May 17, 2002, both of which are incorporated herein by reference in their entireties.

The present invention relates to radical polymerization processes for the preparation of halogenated polymers and to polymers, to the preparation of which the polymerization processes which are a subject matter are particularly well suited.

Halogenated polymers are usually prepared according to a "conventional" radical polymerization process with the involvement of a halogenated monomer and of an agent which generates radicals, which initiates the growth of the polymer chains. According to this process, the time necessary for a polymer chain to grow until it reaches its final size is very short, often less than one second. Also, throughout the duration of a polymerization, new chains are born, grow and "die" virtually immediately by recombination, by disproportionation or by radical transfer. This "death" has a statistical, random, nature; it depends in particular on the polymerization temperature and on the viscosity of the medium. In that way, at the end of the polymerization, a halogenated polymer is obtained which has a randomly spaced molecular mass distribution, the polydispersity index ($M_w/M_n$) and the $M_z/M_w$ ratio of which have values usually of at least 2. Such a process does not make it possible to synthesize polymers having a narrow and controlled molecular mass distribution. Neither does it make it possible to manufacture block copolymers.

Admittedly, halogenated polymers prepared by the abovementioned process are valued because they exhibit several advantageous properties, in particular high chemical resistance to alkalis and to alcohols and high flame retardency. More particularly, the vinyl chloride polymers prepared by the abovementioned process are valued because they can, if need be, be rendered flexible by blending with plasticizers in order to manufacture flexible articles, such as imitation leather.

However, they exhibit a number of weak points, the main one being that the numerous properties of these polymers which depend on the molecular mass are heterogeneous at the molecular scale, this being because these properties can vary from one polymer chain to another in the same way as the molecular mass itself. In particular, the presence of polymer chains of very low molecular mass within the halogenated polymers of the prior art substantially reduces their thermal stability; it also substantially damages the mechanical properties of the articles manufactured starting from the latter, in particular their tensile strength, abrasion resistance and scratching resistance. Conversely, the presence of polymer chains of very high molecular mass within these same halogenated polymers makes it more difficult to process them (higher melt viscosity); it also substantially damages the mechanical properties of the plasticized articles manufactured starting from the latter, due to lack of gelling (imperfect blending, at the molecular level, of the halogenated polymer and of the plasticizer), and other properties of these articles, such as the transparency and the surface finish.

An attempt has already been made to overcome the disadvantages of the abovementioned "conventional" radical polymerization process and the weak points of the halogenated resins prepared by this process by developing a polymerization process disclosed in patent application EP 617 057 A. This process involves, in addition to the halogenated monomer and the radical-generating agent involved in the conventional process, an iodinated organic transfer agent comprising at least one iodine atom bonded to a primary carbon atom, such as 1-chloro-1-iodoethane. It "apes", according to the actual terms employed in this patent application, an "ideal" living radical polymerization process in the sense that, as is shown in example 4 of the abovementioned patent application, the number-average (or weight-average) molecular mass of the halogenated polymers synthesized by this process increases as the halogenated polymer is polymerized. However, the polydispersity index and the $M_z/M_w$ ratio of the halogenated polymers synthesized by this process, although lower than those of the halogentated polymers prepared by the conventional process, remain high (for example, polydispersity index of greater than or equal to 1.70 for vinyl chloride homopolymers), which shows that the process in question is strongly affected by side reactions, just like the conventional process, by transfer and/or disproportionation and/or recombination reactions which interrupt or halt the growth of the polymer chains. Another disadvantage of this process of the prior art is the need to employ an iodinated organic transfer agent, which is generally expensive and increases the cost price of the halogenated polymer.

The development of a process for the radical polymerization of halogenated monomers which is more effective than the processes of the prior art appeared to a person skilled in the art to be a particularly difficult problem as halogenated monomers, in particular vinyl chloride, vinyl fluoride, vinylidene chloride and vinylidene fluoride, were regarded as intrinsically inclined to transfer the radical activity of the growing polymer chains onto themselves (reactions for transfer onto monomer) and/or onto dead polymer chains (reactions for transfer onto polymer).

A subject matter of the present invention is consequently first of all a radical polymerization process for the preparation of halogenated polymers which does not exhibit the disadvantages of the processes of the prior art while retaining their advantages.

To this end, the invention relates to a radical polymerization process for the preparation of halogenated polymers employing (A) one or more ethylenically unsaturated monomers, at least one of which is chosen from halogenated monomers, (B) molecular iodine, and (C) one or more radical-generating agents chosen from diazo compounds, peroxides and dialkyldiphenylalkanes, which comprises the stages according to which (1) at least a fraction of each of the compounds (A), (B) and (C) is introduced into a reactor, then (2) the contents of the reactor are reacted, while introducing therein the optional balance of each of the compounds (A), (B) and (C).

The term "halogenated polymers" is understood to denote both homopolymers of halogenated monomers and the copolymers which the halogenated monomers form with one another or with nonhalogenated monomers. These copolymers can in particular be random copolymers, block copolymers or grafted copolymers.

The term "halogenated monomer" is understood to denote any ethylenically unsaturated monomer which comprises at least one halogen atom. Mention may be made, as examples of halogenated monomers, of halogenated vinyl monomers, halogenated styrene monomers, such as 4-bromostyrene, halogenated (meth)acrylic monomers, such as trifluoroethyl acrylate, and halogenated conjugated dienes, such as chloroprene.

Advantageously, at least 50 mol % and preferably at least 75 mol % of (A) are composed of one or more ethylenically unsaturated monomers chosen from halogenated monomers.

The halogenated monomers are preferably halogenated vinyl monomers. The term "halogenated vinyl monomers" is understood to denote monoethylenically unsaturated halogenated monomers which are aliphatic and which have, as sole heteroatom(s), one or more halogen atoms. Mention may be made, as examples of halogenated vinyl monomers, of brominated vinyl monomers, such as vinyl bromide, fluorinated vinyl monomers and chlorinated vinyl monomers.

The halogenated monomers are particularly preferably chosen from chlorinated vinyl monomers and fluorinated vinyl monomers.

The term "chlorinated vinyl monomers" is understood to denote monoethylenically unsaturated chlorinated monomers which are aliphatic and which have, as sole heteroatom(s), one or more chlorine atoms. Mention may be made, as examples of chlorinated vinyl monomers, of chlorinated vinyl monomers for which the number of chlorine atoms is 1, chlorinated vinyl monomers for which the number of chlorine atoms is 2, trichloroethylene, 1,1,3-trichloropropene and tetrachloroethylene.

A first preferred family of chlorinated vinyl monomers is composed of chlorinated vinyl monomers for which the number of chlorine atoms is 1. Mention may be made, as examples of chlorinated vinyl monomers for which the number of chlorine atoms is 1, of allyl chloride, crotyl chloride and, with a very particular mention, vinyl chloride.

A second preferred family of chlorinated vinyl monomers is composed of chlorinated vinyl monomers for which the number of chlorine atoms is 2. Mention may be made, as examples of chlorinated vinyl monomers for which the number of chlorine atoms is 2, of 1,1-dichloropropene, 1,3-dichloropropene, 2,3-dichloropropene and, with a very particular mention, vinylidene chloride.

The term "fluorinated vinyl monomers" is understood to denote monoethylenically unsaturated fluorinated monomers which are aliphatic and which have, as sole heteroatom(s), one or more fluorine atoms and optionally, in addition, one or more chlorine atoms. Mention may be made, as examples of fluorinated vinyl monomers, of chlorotrifluoroethyleene, trifluoroethylene, perfluorinated vinyl monomers, such as tetrafluoroethylene and hexafluoropropylene, fluorinated vinyl monomers devoid of chlorine atoms and for which the number of fluorine atoms is 1, and fluorinated vinyl monomers devoid of chlorine atoms and for which the number of fluorine atoms is 2.

A first preferred family of fluorinated vinyl monomers is composed of fluorinated vinyl monomers devoid of chlorine atoms and for which the number of fluorine atoms is 1. Mention may be made, as examples of such monomers, of allyl fluoride and, with a very particular mention, vinyl fluoride.

A second preferred family of fluorinated vinyl monomers is composed of fluorinated vinyl monomers devoid of chlorine atoms and for which the number of fluorine atoms is 2. Mention may be made, as examples of such monomers, of 3,3,3-trifluoropropene and, with a very particular mention, vinylidene fluoride.

According to a first preferred alternative form of the radical polymerization process for the preparation of halogenated polymers according to the invention (alternative form (i)), (A) is composed of a single ethylenically unsaturated monomer which is a halogenated monomer.

According to the alternative form (i), advantageously at least 50 mol % of (A) and preferably 100% of (A) are introduced into the reactor in stage (1).

According to a second preferred alternative form of the radical polymerization process for the preparation of halogenated polymers according to the invention (alternative form (ii)), (A) is composed of several ethylenically unsaturated monomers, at least one of which is chosen from halogenated monomers.

According to the alternative form (ii), (A) can optionally, in addition, comprise one or more nonhalogenated monomers.

If appropriate, the nonhalogenated monomers are preferably chosen from styrene monomers, such as styrene, (meth)acrylic monomers, such as n-butyl acrylate and methyl methacrylate, vinyl esters, such as vinyl acetate, and olefinic monomers, such as ethylene, propylene and butadiene.

According to the alternative form (ii), advantageously at least 25 mol % of (A) and preferably at least 50 mol % of (A) are introduced into the reactor in stage (1). Advantageously, at least 25 mol % and preferably 100 mol % of the fraction of (A) introduced into the reactor in stage (1) are composed of one or more halogenated monomers.

According to the alternative form (ii), the respective policies for introducing, into the reactor, the various ethylenically unsaturated monomers constituting (A), in stage (1) and in stage (2), can influence the organization of the repeat units of the Halogenated polymers produced by the reaction.

According to a first preferred alternative subform of the alternative form (ii) (alternative subform (ii.a)), the ethylenically unsaturated monomers constituting (A) are introduced into the reactor according to the same introduction policy.

The halogenated polymers prepared according to the alternative subform (ii.a) are advantageously random copolymers.

According to a second preferred alternative subform of the alternative form (ii) (alternative subform (ii.b)), one of the ethylenically unsaturated monomers constituting (A) is introduced into the reactor in stage (1), the other ethylenically unsaturated monomer or monomers constituting (A) being introduced into the reactor in stage (2), in as many times as the number of ethylenically unsaturated monomers constituting (A) minus 1, one after the other, each new introduction of an ethylenically unsaturated monomer into the reactor in stage (2) being carried out only after the ethylenically unsaturated monomer or monomers previously introduced into the reactor has (have) each reacted up to at least 50 mol %, particularly preferably at least 70 mol % and very particularly preferably at least 90 mol %.

The halogenated polymers prepared according to the alternative subform (ii.b) are advantageously copolymers, the molecular structure of which is similar to but nevertheless different from that which ideal block copolymers exhibit (that is to say, without any interpenetration of the blocks).

According to a third preferred alternative subform of the alternative form (ii) (alternative subform (ii.c)), one of the ethylenically unsaturated monomers constituting (A) [monomer ($M_1$)] is introduced into the reactor in stage (1), all or a fraction of the other ethylenically unsaturated monomer or monomers constituting (A) [monomers $M_2$)] being introduced gradually into the reactor in stage (2).

The optional fraction of the monomer or monomers ($M_2$) which has not been introduced gradually into the reactor in stage (2) is advantageously introduced into the reactor in stage (1).

According to the alternative subform (ii.c), the monomer ($M_2$) or each of the monomers ($M_2$), if there are several of them, advantageously has a greater reactivity than that of the monomer ($M_1$), that is to say that the overall rate at which the monomer ($M_2$) or each of the monomers ($M_2$) is consumed by the reaction is greater than that at which the monomer ($M_1$) is consumed. In addition, the rate of introduction of the monomer ($M_2$) or, if there are several of them, of each of the monomers ($M_2$) into the reactor advantageously increases as the reactivity of this or these monomers increases.

The halogenated polymers prepared according to the alternative subform (ii.c) are advantageously copolymers, the molecular structure of which is similar to that which ideal homogeneous copolymers exhibit (that is to say, all the polymer chains of which comprise exactly the same molar fraction of structural repeat units resulting from each of the copolymerized monomers).

In the radical polymerization process for the preparation of halogenated polymers according to the invention, the molecular iodine (B) can be introduced into the reactor as is or in the form of a precursor which reacts in the reactor to release molecular iodine. Mention may be made, as examples of such precursors, of alkali metal iodides, such as potassium iodide, provided that the reactor comprises an aqueous phase at acidic pH with aqueous hydrogen peroxide solution or a water-soluble organic peroxide. Preferably, (B) is introduced as is.

The number of moles of (B) with respect to the number of moles of (A) advantageously has a value of at least $2.5 \times 10^{-5}$, preferably of at least $5 \times 10^{-5}$ and particularly preferably of at least $10^{-4}$. In addition, the number of moles of (B) with respect to the number of moles of (A) advantageously has a value of at most $10^{-1}$ and preferably of at most $10^{-2}$.

Advantageously, at least 50 mol % of (B) and more advantageously still 100% of (B) are introduced into the reactor before the duration of stage (2) has reached 2 hours, preferably before the duration of stage (2) has reached 1 hour, and particularly preferably in stage (1).

The diazo compounds, the peroxides and the dialkyldiphenylalkanes chosen under (C) can be conventional.

Mention may be made, as examples of diazo compounds, of 4,4'-azobis(4-cyanovaleric acid) (water-soluble diazo compound) and azobisisobutyronitrile (oil-soluble diazo compound).

Mention may be made, as examples of peroxides, of water-soluble peroxides, such as ammonium persulfate and aqueous hydrogen peroxide solution, and oil-soluble peroxides, such as dialkyl peroxides, dialkyl peroxydicarbonates and peresters.

(C) is preferably oil-soluble.

The number of moles of (C) with respect to the number of moles of (B) advantageously has a value of at least 1. In addition, it advantageously has a value of at most 10, preferably of at most 5.

Advantageously, at least 50 mol % of (C) and preferably 100% of (C) are introduced into the reactor in stage (1).

In the radical polymerization process for the preparation of halogenated polymers according to the invention, it is optionally possible, in addition, to introduce into the reactor, in stage (1) and/or in stage (2), (D) one or more complexes of a metal, in the 0 oxidation state or in a strictly positive oxidation state, chosen from transition metals, lanthanides, actinides and metals from Group IIIa, and of a ligand of this metal.

According to a first embodiment of the radical polymerization process for the preparation of halogenated polymers according to the invention (embodiment (I)), the following is additionally introduced into the reactor, in stage (1) and/or in stage (2), (D) one or more complexes of a metal, in the 0 oxidation state or in a strictly positive oxidation state, chosen from transition metals, lanthanides, actinides and metals from Group IIIa, and of a ligand of this metal.

Mention may in particular be made, as examples of metals in the 0 oxidation state, of Al(0), Cr(0), Cu(0), Fe(0), Mg(0), Mo(0), Ni(0), Pb(0), Pd(0), Sm(0), W(0) and Zn(0).

Mention may in particular be made, as examples of metals in the strictly positive oxidation state, of Ce(III), Cu(I), Cu(II), Fe(II), Fe(III), Ni(I), Rh(III), Rh(IV), Ru(III), Ru(IV) and Ti(IV). The metals in a strictly positive oxidation state are advantageously introduced in the form of salts, for example in the form of chlorides, of bromides, of iodides or of tellurides.

The preferred metals are Cu(0), Cu(I), Cu(II) and Ti(IV).

Mention may in particular be made, as examples of ligands of the abovementioned metals, of amino ligands, such as bipyridine (Bpy) and 1,1,4,7,10,10-hexamethyltriethylenetetramine, phosphorus-comprising ligands, such as triphenylphosphine (P(Ph)$_3$), and other ligands, such as indenyl, cyclopentadienyl (Cp), tris[2-aminoethyl]amine (TREN), tris[2-(dimethylamino)ethyl]amine (Me6TREN), and acetylacetonate and butoxide (OBu)$^-$ anions, where Bu denotes an n-butyl group.

The preferred ligands are (OBu)$^-$, Cp, Bpy, TREN and Me6TREN.

Mention may in particular be made, as examples of complexes, of Cu(0)/Bpy, Cu(I)Cl/Bpy, Cu(I)Br/Bpy, Cu(I)I/Bpy, Cu(I)Cl/TREN, Cu(I)Cl/Me6TREN, Cu(II)Te/Bpy, Ti(IV)Cp$_2$Cl$_2$ and Ti(IV)(OBu)$_4$. The abovementioned complexes have given very good results.

According to the embodiment (I), the number of moles of (D) with respect to the number of moles of (B) advantageously has a value of at least $10^{-2}$, preferably of at least $10^{-1}$. In addition, it advantageously has a value of at most $10^2$, preferably of at most $10^1$.

According to the embodiment (I), the number of moles of (C) with respect to the number of moles of (B) advantageously has a value of at most 1.4 and preferably of at most 1.2.

According to a second preferred embodiment of the radical polymerization process for the preparation of halogenated polymers according to the invention (embodiment (II)), the contents of the reactor, in stage (1) and in stage (2), are devoid of complex of a metal, in the 0 oxidation state or in a strictly positive oxidation state, chosen from transition metals, lanthanides, actinides and metals from Group IIIa, and of a ligand of this metal.

According to the embodiment (II), the number of moles of (C) with respect to the number of moles of (B) advantageously has a value of at least one 1.2 and preferably of at least 1.4.

The radical polymerization process for the preparation of halogenated polymers according to the invention can be in particular a solution, solution/bulk bulk, suspension, microsuspension or emulsion polymerization process. Thus, in the radical polymerization process for the preparation of halogenated polymers according to the invention, it is optionally possible to introduce into the reactor, in stage (1) and/or in stage (2), in addition to (A), (B), (C) and optionally (D), up to 1000% by weight, with respect to the weight of (A), of one or more ingredients conventionally employed to polymerize halogenated monomers, such as water, supercritical $CO_2$, liquid organic dispersants, such as isopropanol, organic solvents, such as benzene, tetrahydrofuran and cyclohexanone, dispersing agents, such as poly(vinyl alcohol)s, or emulsifying agents, such as ammonium myristate (ingredients (U)).

In order to bring about the reaction of the contents of the reactor according to stage (2), use is made of means by which radicals are generated within it. To this end, the contents can in particular be heated or can be exposed to intense light radiation.

The temperature at which the contents of the reactor are reacted advantageously has a value of at least 30° C. and preferably of at least 40° C. In addition, it advantageously has a value of at most 200° C. and preferably of at most 120° C.

Advantageously, stage (2) is carried out until the halogenated monomer or monomers, on the one hand, and the optional nonhalogenated monomer or monomers, on the other hand, have reacted within certain limits.

Thus, on the one hand, stage (2) is carried out until preferably at least 10 mol % of the halogenated monomer or monomers introduced into the reactor have reacted. In addition, stage (2) is carried out until (i) preferably at most 70 mol % and particularly preferably at most 35 mol % of the halogenated monomer or monomers introduced into the reactor have reacted, if the ethylenically unsaturated monomer or monomers introduced into the reactor are exclusively chlorinated vinyl monomers, (ii) preferably at most 85 mol % and particularly preferably at most 70 mol % of the halogenated monomer or monomers introduced into the reactor have reacted, if the ethylenically unsaturated monomer or monomers introduced into the reactor are exclusively halogenated monomers other than chlorinated vinyl monomers, and (iii) preferably at most 95 mol % of the halogenated monomer or monomers introduced into the reactor have reacted, if at least one ethylenically unsaturated monomer introduced into the reactor is a nonhalogenated monomer.

On the other hand, stage (2) is carried out until preferably at least 50 mol % of the optional nonhalogenated monomer or monomers introduced into the reactor have reacted. In addition, stage (2) is carried out until preferably at most 95 mol % of the optional nonhalogenated monomer or monomers introduced into the reactor have reacted.

To bring stage (2) to an end, it is possible, for example, to cool the contents of the reactor and/or to introduce therein a powerful inhibiting agent and/or to extract therefrom the fraction of (A) which has not reacted, it being possible for these operations to be carried out simultaneously or successively, in the reactor or outside the latter.

Preferably, stage (2) is brought to an end by extracting, from the contents of the reactor, the fraction of (A) which is not reacted (demonomerization treatment), optionally after having cooled the contents of the reactor and/or having introduced therein a powerful inhibiting agent.

When the fraction of (A) which has not reacted has a sufficient volatility, it will advantageously be extracted from the contents of the reactor by placing the latter under vacuum.

The radical polymerization process for the preparation of halogenated polymers according to the invention can, in addition optionally comprise a stage, subsequent to the preceding stages, according to which the halogenated polymer is isolated from the contents of the reactor (stage (3)).

Use may be made, to isolate the halogenated polymer from the contents of the reactor, of, in addition to the demonomerization treatment already discussed above, any separation technique known to a person skilled in the art, in particular precipitation (especially when the halogenated polymer has been produced by a solution or solution/bulk process), filtering and drying in a fluidized bed (especially when the halogenated polymer has been produced by a suspension process), and drying by atomization or by coagulation (especially when the halogenated polymer has been produced by an emulsion or microsuspension process). These operations are advantageously carried out outside the reactor.

The radical polymerization process for the preparation of halogenated polymers according to the invention is advantageously carried out in order to prepare the halogenated polymers according to the invention.

Subsequently, a subject matter of the present invention is a radical polymerization process for the preparation of block copolymers, at least one block of which is a halogenated polymer block.

To this end, the invention relates to a radical polymerization process for the preparation of block copolymers, at least one block of which is a halogenated polymer block, employing (A') one or more ethylenically unsaturated monomers, and (B') one or more halogenated polymers chosen from the polymers prepared by the process as described above and from those prepared during a preliminary stage by the process concerned with here, which comprises the stages according to which (1') at least one fraction of (A') and at least one fraction of (B') are introduced into a reactor, then (2') the contents of the reactor are reacted, while introducing therein the optional balance of (A') and the optional balance of (B').

The radical polymerization process for the preparation of block copolymers according to the invention corresponds to the same characteristics and preferences as those described above regarding the radical polymerization process for the preparation of halogenated polymers, except for counterindication or unless it is otherwise specified thereof.

The number of ethylenically unsaturated monomers constituting (A') can take any value. Preferably, it has a value of at most 2.

The ethylenically unsaturated monomer or monomers constituting (A') can be chosen without distinction from halogenated monomers and nonhalogenated monomers.

(B') can be introduced into the reactor in any form whatsoever, in particular in the form of a powder, of a dispersion, of an emulsion or of a solution, and after having or not having been isolated from the contents of the reactor in which it was prepared beforehand. (B') is introduced into the reactor preferably after having been isolated from the contents of the reactor in which it was prepared beforehand.

The number of halogenated polymers constituting (B') preferably has a value of 1.

Preferably, all of (B') is introduced into the reactor in stage (1').

The weight of (B') with respect to the weight of (A') advantageously has a value of at least 0.1 and preferably of at least 0.5. In addition, it advantageously has a value of at most 4.

In the radical polymerization process according to the invention, (C') one or more radical-generating agents chosen from peroxides, diazo compounds and dialkyldiphenylalkanes is/are, in addition, advantageously introduced into the reactor in stage (1') and/or in stage (2').

(C') corresponds to the same characteristics and to the same preferences as (C), this being the case whatever the degree of preference.

In the radical polymerization process for the preparation of block copolymers according to the invention, (D') one or more complexes of a metal, in the 0 oxidation state or in a strictly positive oxidation state, chosen from transition metals, lanthanides, actinides and metals from Group IIIa, and of a ligand of this metal can, in addition, optionally be introduced into the reactor in stage (1') and/or in stage (2').

(D') corresponds to the same characteristics and to the same preferences as (D), this being the case whatever the degree of preference.

The radical polymerization process for the preparation of block copolymers according to the invention is advantageously carried out to prepare the block copolymers according to the invention.

Subsequently, a subject matter of the present invention is halogenated polymers which do not exhibit the disadvantages of the halogenated polymers of the prior art while retaining their advantages and which can in particular be obtained by the radical polymerization process for the preparation of halogenated polymers described above.

To this end, the invention relates to halogenated polymers which have a number-average molecular mass $M_n$ of greater than $1.0 \times 10^4$ and an $M_z/M_w$ ratio of less than 1.65.

The distribution of the molecular masses of the halogenated polymers according to the invention is usually determined by steric exclusion chromatography, as clarified in example 1 of the present document.

From the distribution of the molecular masses thus obtained, it is possible in particular to calculate:
the number-average molecular mass $M_n = \Sigma N_i M_i / \Sigma N_i$, where $N_i$ is the number of moles of polymer with a molecular mass of $M_i$,
the weight-average molecular mass $M_w = \Sigma N_i M_i^2 / \Sigma N_i M_i$,
the higher order average molecular mass $M_z = \Sigma N_i M_i^3 / \Sigma N_i M_i^2$,
the polydispersity index $M_w/M_n$,
the $M_z/M_w$ ratio.

The halogenated polymers according to the invention have a number-average molecular mass $M_n$ preferably of greater than $1.4 \times 10^4$, particularly preferably of greater than $1.8 \times 10^4$.

The halogenated polymers according to the invention have an $M_z/M_w$ ratio preferably of less than 1.60.

In addition, the halogenated polymers according to the invention have a polydispersity index $M_w/M_n$ advantageously of less than 2.00.

The halogenated polymers according to the invention can just as easily be homopolymers of halogenated monomers as copolymers formed by halogenated monomers with one another or with nonhalogenated monomers. They are preferably formed by at least 50 mol %, particularly preferably by at least 80 mol % and very particularly preferably by 100% of halogenated monomers.

In addition, they are preferably polymers of halogenated vinyl monomers. Particularly preferably, they are chosen from polymers of chlorinated vinyl monomers and polymers of fluorinated vinyl monomers.

Mention may be made, as examples of polymers of chlorinated vinyl monomers, of polymers of chlorinated vinyl monomers for which the number of chlorine atoms is 1, polymers of chlorinated vinyl monomers for which the number of chlorine atoms is 2, trichloroethylene polymers, 1,1,3-trichloropropene polymers and tetrachloroethylene polymers.

A first preferred family of polymers of chlorinated vinyl monomers is composed of polymers of chlorinated vinyl monomers for which the number of chlorine atoms is 1. Mention may be made, as examples of such polymers, of allyl chloride polymers, crotyl chloride polymers and, with a very particular mention, vinyl chloride polymers.

The preferred vinyl chloride polymers have a polydispersity index $M_w/M_n$ advantageously of less than 1.60, preferably of less than 1.50 and particularly preferably of less than 1.45. In addition, they have an $M_z/M_w$ ratio preferably of less than 1.50.

A second preferred family of polymers of chlorinated vinyl monomers is composed of polymers of chlorinated vinyl monomers for which the number of chlorine atoms is 2. Mention may be made, as examples of such polymers, of 1,1-dichloropropene polymers, 1,3-dichloropropene polymers, 2,3-dichloropropene polymers and, with a very particular mention, vinylidene chloride polymers.

Mention may be made, as examples of polymers of fluorinated vinyl monomers, of chlorotrifluoroethylene polymers, trifluoroethylene polymers, polymers of perfluorinated vinyl monomers, such as tetrafluoroethylene polymers and hexafluoropropylene polymers, polymers of fluorinated vinyl monomers devoid of chlorine atoms and for which the number of fluorine atoms is 1, and polymers of fluorinated vinyl monomers devoid of chlorine atoms and for which the number of fluorine atoms is 2.

A first preferred family of polymers of fluorinated vinyl monomers is composed of polymers of fluorinated vinyl monomers devoid of chlorine atoms and for which the number of fluorine atoms is 1. Mention may be made, as examples of such polymers, of allyl fluoride polymers and, with a very particular mention, vinyl fluoride polymers.

A second preferred family of polymers of fluorinated vinyl monomers is composed of polymers of fluorinated vinyl monomers devoid of chlorine atoms and for which the number of fluorine atoms is 2. Mention may be made, as examples of such polymers, of 3,3,3-trifluoropropene polymers and, with a very particular mention, vinylidene fluoride polymers.

The preferred vinylidene fluoride polymers have a polydispersity index $M_w/M_n$ advantageously of less than 1.85, preferably of less than 1.75.

The halogenated polymers according to the invention can be in the form of liquids or of powders. Preferably, they are in the form of powders.

The halogenated polymers according to the invention have a whiteness, measured with a Minolta® CR 200 chromameter, advantageously having a value of at least 80%, preferably of at least 85%. The measurement with a Minolta® CR 200 chromameter of the whiteness of the halogenated polymers according to the invention is carried out as clarified in example 1 of the present document.

Subsequently, a final subject matter of the present invention is consequently block copolymers, at least one block of which is a halogenated polymer block, which exhibit numerous advantages and which can in particular be obtained by the radical polymerization process for the preparation of block copolymers described above.

To this end, the invention relates to block copolymers, at least one block of which is a block of halogenated polymer identical to the halogenated polymers described above (($CB_1$) block copolymers).

It also relates to block copolymers, at least one block of which is a halogenated polymer block, which have a number-average molecular mass $M_n$ of greater than $1.5 \times 10^4$ and a polydispersity index $M_w/M_n$ of less than 1.60 (($CB_2$) block copolymers).

Both for the ($CB_1$) block copolymers and for the ($CB_2$) block copolymers according to the present invention, the weight of the halogenated polymer block or blocks advantageously has a value of at least 1/10, preferably of at least 1/3, of the weight of the block copolymers according to the invention. In addition, it advantageously has a value of at most 4/5 of the weight of the ($CB_1$) and ($CB_2$) block copolymers according to the invention.

The ($CB_1$) and ($CB_2$) block copolymers according to the invention can optionally comprise one or more blocks of nonhalogenated polymer. Mention may be made, as examples of such blocks, of blocks of styrene homopolymers and blocks of random copolymers of styrene and of acrylonitrile. Preferably, the block or blocks of nonhalogenated polymer are blocks of homopolymers.

Mention may be made, as examples of block copolymers according to the invention, of the diblock copolymer composed of a block of a random copolymer of vinylidene chloride and of methyl acrylate and of a block of a styrene homopolymer as manufactured according to example 7 of the present document.

Subsequently, a subject matter of the present invention is articles made of halogenated polymer which do not exhibit the disadvantages of the articles made of halogenated polymer of the prior art while retaining their advantages.

To this end, the invention relates to articles manufactured by using one or more polymers chosen from the polymers prepared by the processes as described above and the polymers as described above.

Mention may in particular be made, as examples of such articles, of compact layers, films, sheets, panels and profiles, tubes and pipes, mastics and cell layers.

These articles are usually manufactured conventionally by applying known processing techniques, such as calendering, extrusion, injection molding, coating, spraying, dipping and molding.

There are many advantages to the radical polymerization processes according to the invention.

They have a well attested living nature, although employing halogenated monomers, such as vinyl chloride, vinylidene chloride, vinyl fluoride and vinylidene fluoride, regarded as intrinsically inclined to transfer the radical activity of the growing polymer chains onto themselves (reactions for transfer onto monomer) and/or onto dead polymer chains (reactions for transfer onto polymer).

Surprisingly, in the radical polymerization processes according to the invention, a large number of polymer chains are (re)born at the beginning of the polymerization and grow throughout the polymerization, without interruption or halting by transfer and/or disproportionation and/or recombination side reactions; the processes according to the invention are thus distinguished with regard to the reaction mechanism from known radical polymerization processes.

From a macroscopic viewpoint, this is reflected in the fact that the radical polymerization processes according to the invention are such that, during the reaction, the number-average (or weight-average) molecular mass of the polymers continually increases when the fraction of halogenated monomer which has reacted increases, whereas it remains virtually constant throughout a "conventional" radical polymerization.

Another advantage of the radical polymerization processes according to the invention, related to the above, is that the growth of the polymer chains of the halogenated polymers prepared by these processes can be reinitiated, bringing about the further reaction of the polymers, even after having been isolated from the polymerization medium, with ethylenically unsaturated monomers identical to or different from those which had been polymerized previously. In this way, it is possible to prepare block copolymers comprising at least one halogenated polymer block. In contrast, it is usually impossible to synthesize such copolymers according to the "conventional" radical polymerization process.

A final advantage of the radical polymerization processes according to the invention is that they do not need to employ starting materials which are usually expensive, such as iodinated organic transfer agents.

The polymers according to the invention retain all the advantageous characteristic properties of the halogenated polymers of the prior art, in particular high chemical resistance to alkalis and to alcohols and high flame retardancy.

They have a polydispersity index $M_w/M_n$ and an $M_z/M_w$ ratio which are substantially reduced with respect to the polymers of the prior art.

In addition, they exhibit a number of other advantages related to their low polydispersity index. The main advantage is that the many properties of these polymers dependent on the molecular mass exhibit, at the molecular scale, an improved homogeneity with respect to the halogenated polymers of the prior art.

Because they are devoid of polymer chains of very low molecular mass, the halogenated polymers according to the invention have a greater thermal stability than that of the halogenated polymers of the prior art; furthermore, the articles manufactured starting from these polymers have mechanical properties, in particular tensile strength, abrasion resistance and scratching resistance, which are better than those of the articles manufactured starting from the halogenated polymers of the prior art.

Because they are devoid of polymer chains of very high molecular mass, the halogenated polymers according to the invention are employed in the molten state more easily than the halogenated polymers of the prior art; for the same reason, the plasticized articles manufactured starting from these polymers are better gelled and thus have mechanical properties, a transparency and a surface finish which are better than those of the articles manufactured starting from the halogenated polymers of the prior art.

The examples which follow are intended to illustrate the invention without, however, limiting the scope thereof.

EXAMPLE 1

(According to the Invention)

2000 g of demineralized water, 6 g of poly(vinyl alcohol) (dispersing agent), 1.5 g of molecular iodine and 1.5 g of diethyl peroxydicarbonate (radical-generating agent) were first of all introduced into a 3.51 jacketed reactor equipped with a stirrer. The reactor was closed and then the stirrer was started. A vacuum was applied in the reactor.

1000 g of vinyl chloride were introduced into the reactor. The contents of the reactor were brought to 60° C. The moment at which the temperature of the contents of the reactor reached 60° C. is known as $t_o$. Reaction was allowed to take place.

At $t_o+3$ h 30, the reaction was halted by cooling the contents of the reactor (slurry) to ambient temperature as rapidly as possible.

The slurry was purified from unconverted vinyl chloride. The water was subsequently removed therefrom by filtering and drying in a fluidized bed. A poly(vinyl chloride) powder was thus obtained.

The fraction of vinyl chloride which has reacted (degree of conversion (f)), expressed as %, was calculated from the dry matter content of the slurry, itself determined by gravimetry.

The K value of the poly(vinyl chloride) was determined according to standard ISO 1628-2.

The distribution of the molecular masses of the poly(vinyl chloride) was also determined by steric exclusion chromatography and the whiteness of the poly(vinyl chloride) was also determined using a Minolta CR® 200 chromameter, as clarified below.

Determination of the Distribution of the Molecular Masses of a Polymer

The distribution of the molecular masses of the polymer was determined using a Waters® Alliance 2692 chromatograph equipped with a Shodex RI, model 2410, detector and with Waters® Styragel HR4, HR3 and HR2 columns in series, using dimethylformamide additivated with LiBr as diluent at a concentration of 0.1 mol/liter, at a flow rate of 1 ml/min and at a temperature of 40° C. The chromatograph had been calibrated beforehand using poly(methyl methacrylate) standards, the Mark-Houwink factors being $\alpha=0.770$ and $k=9.45\times10^{-5}$.

Determination of the Whiteness of a Polymer

A Minolta CR® 200 chromameter equipped with a xenon arc lamp was switched on and the device was allowed to stabilize. The latter was configured in colors, multimeasurements, channel 00 mode, with the C source as illuminant. The channel 00 was subsequently calibrated using an aluminum oxide standard tile. The polymer was poured into a measuring cup, provided for this purpose, until the cup slightly overflows, then a Matobel® glass sheet was placed over it and slight compression was applied so that the sheet comes into contact with the edge of the cup. The measuring head of the chromameter was subsequently placed on the sheet and 3 measurements (3 light flashes) of the Y, x, y coordinates of the CIE Lab 1931 space were performed consecutively. The mean thereof was determined and then the trichromatic component $Z=x\times Y^2/y^2-Y$ and the whiteness of the resin $B=a\times Z-b$ were calculated, a having a value of 0.9 and b having a value of 1.085, a and b being empirical coefficients determined beforehand experimentally so as to align the results obtained according to the present measurement technique with those obtained using a Photovolt® model 670 reflectometer.

EXAMPLE 2

(According to the Invention)

The preparation was carried out as in example 1, except that the reaction was halted at $t_o+4$ h (instead of $t_o+3$ h 30).

EXAMPLE 3

(According to the Invention)

The preparation was carried out as in example 1, except that the reaction was halted at $t_o+5$ h (instead of $t_o+3$ h 30).

The results of the various measurements of examples 1 to 3 are presented in table 1.

TABLE 1

| Example | f (%) | Kv | $M_n$ (×10⁴) | $M_w$ (×10⁴) | $M_z$ (×10⁴) | $M_w/M_n$ | $M_z/M_w$ | B (%) |
|---|---|---|---|---|---|---|---|---|
| 1 | 10 | n.m. | 2.0 | 2.6 | 3.5 | 1.30 | 1.35 | n.m. |
| 2 | 22 | 43.1 | 2.0 | 2.8 | 3.9 | 1.40 | 1.39 | 85.0 |
| 3 | 33 | 44.8 | 2.4 | 3.4 | 4.8 | 1.42 | 1.41 | 87.3 | n.m. = not measured

EXAMPLE 4

(Comparative Example)

The distribution of the molecular masses of commercial vinyl chloride homopolymers was determined using a Waters® Alliance 2692 chromatograph under exactly the same conditions as those applied in examples 1 to 3.

The results of the measurements of example 4 are presented in table 2.

TABLE 2

| Resin | Kv | $M_n$ (×10⁴) | $M_w$ (×10⁴) | $M_z$ (×10⁴) | $M_w/M_n$ | $M_z/M_w$ |
|---|---|---|---|---|---|---|
| PVC, Solvin® 266RC | 66.0 | 4.8 | 9.6 | 16.2 | 2.00 | 1.69 |
| PVC, Solvin® 275PC | 74.8 | 6.1 | 12.6 | 21.3 | 2.07 | 1.69 |

EXAMPLE 5

(According to the Invention)

2429 g of demineralized water, a methylhydroxypropylcellulose dispersing agent, in a proportion of 0.04 g per 100 g of monomer, and 4.1 g (0.016 mol) of molecular iodine were successively introduced into a 4 liter jacketed reactor equipped with a stirrer of turbine type rotating at 880 revolutions/minute. A vacuum was applied. 13.4 g of tert-amyl perpivalate were introduced. After having waited 5 minutes, 609 g (4.06 mol) of hexafluoropropylene and 644 g (10.06 mol) of vinylidene fluoride were successively charged to the reactor. The contents of the reactor were gradually heated until the latter had reached the stationary temperature of 60° C. 614 g (9.59 mol) of vinylidene fluoride were gradually injected into the reactor, so as to keep the pressure constant therein at a value of 120 bar. Subsequently, the pressure in the reactor was allowed to gradually fall until it had reached 100 bar. The contents of the reactor were then heated to 65° C. When the pressure in the reactor had reached 60 bar, i.e. 597 min after having reached the stationary temperature of 60° C., the aqueous suspension was degassed (by lowering the pressure to atmospheric pressure). The copolymer was subsequently collected by filtration and then it was resuspended in clean water in a vessel with stirring. After a washing cycle, the polymer was dried in an oven to constant weight.

The fraction by weight of hexafluoropropylene and of vinylidene fluoride which had been consumed overall by the reaction was determined: this was 67%.

Furthermore, the distribution of the molecular masses of the copolymer thus prepared was determined using a Waters® Alliance 2692 chromatograph under exactly the same conditions as those applied in examples 1 to 3. The following were obtained:

$M_n=7.7\times10^4$, $M_w=13.0\times10^4$, $M_z=20.6\times10^4$, $M_w/M_n=1.69$ and $M_z/M_w=1.58$.

EXAMPLE 6

(Comparative Example)

The preparation was carried out as in example 5, except that iodine was not introduced into the reactor.

The pressure in the reactor had reached 60 bar 261 min after having reached the stationary temperature of 60° C.

The fraction by weight of hexafluoropropylene and of vinylidene fluoride which had been consumed overall by the reaction was determined: this was 73%.

Furthermore, the distribution of the molecular masses of the copolymer thus prepared was determined using a Waters® Alliance 2692 chromatograph under exactly the same conditions as those applied in example 5. The following were obtained:

$M_n=9.5\times10^4$, $M_w=20.9\times10^4$, $M_z=41.4\times10^4$, $M_w/M_n=2.20$ and $M_z/M_w=1.98$.

EXAMPLE 7

(According to the Invention)

A vacuum was applied in a 300 ml glass reactor. A first solution, composed of 64.8 g of vinylidene chloride, 14.4 g of methyl acrylate, 1.006 g of molecular iodine and 88 g of benzene, was subsequently introduced therein and then a second solution, composed of 0.975 g of azobisisobutyronitrile and 10 g of benzene, was subsequently introduced therein.

Immediately after having introduced the second solution into the reactor, the latter was placed in a bath thermostatically controlled at 70° C. The moment at which the temperature of the contents of the reactor reached 70° C. is $t_o$. Reaction was allowed to take place.

At $t_o+30$ hours, the reaction was halted by cooling the contents of the reactor to ambient temperature as rapidly as possible (intermediate solution (S1)).

(S1) essentially comprise a copolymer of vinylidene chloride and of methyl acrylate (intermediate polymer (P1)) and unconverted vinylidene chloride and methyl acrylate, in solution in benzene.

The polymer (P1) included in the intermediate solution (S1) was precipitated from methanol for approximately 72 hours and was then filtered off and dried in an oven under vacuum (intermediate polymer (P'1)).

6.01 g of styrene and 2.43 g of polymer (P'1) were introduced into a 25 ml glass reactor. A vacuum was applied.

The reactor was subsequently placed in a bath thermostatically controlled at 110° C. The moment at which the temperature of the contents of the reactor reached 110° C. is $t_1$. Reaction was allowed to take place.

At $t_1+5$ h 45, the reaction was halted by cooling the contents of the reactor to ambient temperature as rapidly as possible (final solution/bulk (S2)).

(S2) essentially comprised a block copolymer comprising a block of a copolymer of vinylidene chloride and of methyl acrylate and a polystyrene block (block copolymer (P2)), and unconverted styrene.

Starting from a sample of (S2), the distribution of the molecular masses of the block copolymer (P2) was determined by steric exclusion chromatography.

The following results relating to the distribution of the molecular masses of (P2) were obtained: $M_n=2.0\times10^4$, $M_z=4.3\times10^4$ and $M_w/M_n=1.58$.

The invention claimed is:

1. A radical polymerization process for the preparation of a polymer of chlorinated vinyl monomer or monomers employing
    (A) one or more ethylenically unsaturated monomers, at least one of which is chosen from chlorinated vinyl monomers,
    (B) molecular iodine, and
    (C) one or more radical-generating agents chosen from diazo compounds, peroxides and dialkyldiphenylalkanes,
    which comprises the stages according to which
    (1) at least a fraction of each of the compounds (A), (B) and (C) is introduced into a reactor, then
    (2) the contents of the reactor are reacted, while introducing therein the optional balance of each of the compounds (A), (B) and (C), until:
    at most 70 mol % of the chlorinated vinyl monomer or monomers introduced into the reactor have reacted, if the ethylenically unsaturated monomer or monomers introduced into the reactor are exclusively chlorinated vinyl monomers, and
    at most 95 mol % of the chlorinated vinyl monomer or monomers introduced into the reactor have reacted, if at least one ethylenically unsaturated monomer introduced into the reactor is a nonhalogenated monomer, then
    (2b) the reaction is brought to an end.

2. The process as claimed in claim 1, wherein at least 50 mol % of (A) are composed of one or more ethylenically unsaturated monomers chosen from chlorinated vinyl monomers.

3. The process as claimed in claim 1, wherein the ethylenically unsaturated monomer or one of the ethylenically unsaturated monomers is vinyl chloride.

4. The process as claimed in claim 1, wherein the ethylenically unsaturated monomer or one of the ethylenically unsaturated monomers is vinylidene chloride.

5. The process as claimed in claim 1, wherein (A) is comprised of a single ethylenically unsaturated monomer which is a chlorinated vinyl monomer, at least 50 mol % of (A) being introduced into the reactor in stage (1).

6. The process as claimed in claim 1, wherein (A) is comprised of several ethylenically unsaturated monomers, one of the ethylenically unsaturated monomers comprised in (A) being introduced into the reactor in stage (1), the other ethylenically unsaturated monomer or monomers comprised in (A) being introduced into the reactor in stage (2), in as many times as the number of ethylenically unsaturated monomers comprised in (A) minus 1, one after the other, each new introduction of an ethylenically unsaturated monomer into the reactor in stage (2) being carried out only after the ethylenically unsaturated monomer or monomers previously introduced into the reactor has (have) each reacted up to at least 50 mol %.

7. The process as claimed in claim 1, wherein (A) is comprised of several ethylenically unsaturated monomers, one of the ethylenically unsaturated monomers comprised in (A) being introduced into the reactor in stage (1), all or a fraction of the other ethylenically unsaturated monomer or monomers comprised in (A) being introduced gradually into the reactor in stage (2).

8. The process as claimed in claim 1, wherein the number of moles of (B) with respect to the number of moles of (A) has a value of at least $2.5 \times 10^{-5}$.

9. The process as claimed in claim 1, wherein at least 50 mol % of (B) are introduced into the reactor in stage (1).

10. The process as claimed claim 1, wherein number of moles of (C) with respect to the number of moles of (B) has a value of at least 1.

11. The process as claimed in claim 1, wherein
one or more complexes of a metal, in the 0 oxidation state or in a strictly positive oxidation state, chosen from transition metals, lanthanides, actinides and metals from Group IIIa, and of a ligand of this metal
is additionally introduced into the reactor, in stage (1) and/or in stage (2).

12. The process as claimed in claim 1, wherein the contents of the reactor, in stage (1) and in stage (2), are devoid of complex of a metal, in the 0 oxidation state or in a strictly positive oxidation state, chosen from transition metals, lanthanides, actinides and metals from Group IIIa, and of a ligand of this metal.

13. A radical polymerization process for the preparation of a block copolymer, at least one block of which is a polymer of chlorinated vinyl monomer or monomers block, comprising reacting:
(A') one or more ethylenically unsaturated monomers, and
(B') one or more polymers of chlorinated vinyl monomer or monomers chosen from polymers prepared by the process as claimed in claim 1 or chosen from a precursor block copolymer,
wherein
(1') all or optionally a fraction of (A') and all or optionally a fraction of (B') are introduced into a reactor, then
(2') the contents of the reactor are reacted, while introducing therein the optional balance of (A') and the optional balance of (B'),
wherein the precursor block copolymer is prepared by reacting one or more ethylenically unsaturated monomers and one or more polymers of chlorinated vinyl monomer or monomers chosen from polymers prepared by the process as claimed in claim 1.

14. A polymer of chlorinated vinyl monomer or monomers having a number-average molecular mass Mn of greater than $1.0 \times 10^4$ and an Mz/Mw ratio of less than 1.65.

15. The polymer as claimed in claim 14, wherein said polymer is a vinyl chloride polymer and has a polydispersity index Mw/Mn of less than 1.60.

16. The polymers as claimed in claim 14, wherein said polymer has a whiteness, measured with a Minolta® CR 200 chromameter, with a value of at least 80%.

17. A block copolymer comprising at least one block of polymer of chlorinated vinyl monomer or monomers as claimed in claim 14.

18. A block copolymer comprising at least one polymer of chlorinated vinyl monomer or monomers block, which has a number-average molecular mass $M_n$ of greater than $1.5 \times 10^4$ and a polydispersity index $M_w/M_n$ of less than 1.60.

19. An article comprising one or more polymers chosen from the polymers prepared by the process as claimed in claim 1, and a polymer of chlorinated vinyl monomer or monomers having a number-average molecular mass $M_n$ of greater than $1.0 \times 10^4$ and an $M_z/M_w$ of less than 1.65.

20. A method of conferring a living nature on a radical polymerization process, said method comprising incorporating molecular iodine in said radical polymerization process for preparing polymers of chlorinated vinyl monomer or monomers employing one or more ethylenically unsaturated monomers, at least one of which is chosen from chlorinated vinyl monomers, and one or more radical-generating agents chosen from diazo compounds, peroxides and dialkyldiphenylalkanes,
according to which the radical polymerization process comprises the following stages:
at least one fraction of the molecular iodine, at least one fraction of the ethylenically unsaturated monomer or monomers and at least one fraction of the radical-generating agent or agents are introduced into a reactor, then
the contents of the reactor are reacted while introducing therein the optional balance of the molecular iodine, of the ethylenically unsaturated monomer or monomers and of the radical-generating agent or agents until:
at most 70 mol % of the chlorinated vinyl monomer or monomers introduced into the reactor have reacted, if the ethylenically unsaturated monomer or monomers introduced into the reactor are exclusively chlorinated vinyl monomers, and
at most 95 mol % of the chlorinated vinyl monomer or monomers introduced into the reactor have reacted, if at least one ethylenically unsaturated monomer introduced into the reactor is a nonhalogenated monomer, then
the reaction is brought to an end.

21. A method to prepare a polymer of chlorinated vinyl monomer or monomers, said method comprising incorporating molecular iodine in a radical polymerization process employing one or more ethylenically unsaturated monomers, at least one of which is chosen from chlorinated vinyl monomers, and one or more radical-generating agents chosen from diazo compounds, peroxides and dialkyldiphenylalkanes,
according to which the radical polymerization process comprises the following stages:

at least one fraction of the molecular iodine, at least one fraction of the ethylenically unsaturated monomer or monomers and at least one fraction of the radical-generating agent or agents are introduced into a reactor, then the contents of the reactor are reacted while introducing therein the optional balance of the molecular iodine, of the ethylenically unsaturated monomer or monomers and of the radical-generating agent or agents, to prepare polymers of chlorinated vinyl monomer or monomers, the growth of the polymer chains of which can be reinitiated, these polymers again being reacted, optionally after having been isolated from their polymerization medium, with ethylenically unsaturated monomers which are identical to or different from those which had been polymerized previously.

* * * * *